(12) United States Patent
Soluri et al.

(10) Patent No.: US 12,681,193 B2
(45) Date of Patent: Jul. 14, 2026

(54) SCINTIGRAPHIC INTRACAVITARY MEASUREMENT DEVICE

(71) Applicant: CONSIGLIO NAZIONALE DELLE RICERCHE, Rome (IT)

(72) Inventors: Alessandro Soluri, Rome (IT); Roberto Massari, Nettuno (IT)

(73) Assignee: CONSIGLIO NAZIONALE DELLE RICERCHE, Rome (IT)

( * ) Notice: Subject to any disclaimer, the term of this patent is extended or adjusted under 35 U.S.C. 154(b) by 174 days.

(21) Appl. No.: 18/702,076

(22) PCT Filed: Sep. 26, 2022

(86) PCT No.: PCT/IB2022/059115
§ 371 (c)(1),
(2) Date: Apr. 17, 2024

(87) PCT Pub. No.: WO2023/073451
PCT Pub. Date: May 4, 2023

(65) Prior Publication Data
US 2025/0012932 A1 Jan. 9, 2025

(30) Foreign Application Priority Data
Oct. 29, 2021 (IT) ........................ 102021000027752

(51) Int. Cl.
*G01T 1/00* (2006.01)
*G01T 1/164* (2006.01)
(52) U.S. Cl.
CPC .......... *G01T 1/1642* (2013.01); *G01T 1/1647* (2013.01); *G01T 1/1648* (2013.01)

(58) Field of Classification Search
CPC ..... G01T 1/161; G01T 1/1642; G01T 1/1647; G01T 1/1648
See application file for complete search history.

(56) References Cited

U.S. PATENT DOCUMENTS

| | | | |
|---|---|---|---|
| 4,959,547 A | 9/1990 | Carroll |
| 5,846,513 A | 12/1998 | Carroll |
| 2005/0263707 A1 | 12/2005 | Tomita |

FOREIGN PATENT DOCUMENTS

| | | |
|---|---|---|
| DE | 19616386 C1 | 4/1997 |
| WO | 2013168188 A2 | 11/2013 |
| WO | 2019090441 A1 | 5/2019 |

OTHER PUBLICATIONS

International Search Report for PCT/IB2022/059115, mailed Dec. 20, 2022, 4 pages.
Written Opinion of the ISA for PCT/IB2022/059115, mailed Dec. 20, 2022, 6 pages.

*Primary Examiner* — Dani Fox
(74) *Attorney, Agent, or Firm* — NIXON & VANDERHYE, PC

(57) ABSTRACT
Described is a scintigraphic intracavitary measurement device (100) comprising a supporting rod (10) extending along a main direction of extension (X) and a measuring head (20) coupled or integrated with a first end (10*a*) of said supporting rod (10). The measuring head (20) comprises at least one collimation element (30) configured to filter gamma radiation emitted by a source (S) defined by a suitably energised body tissue and a scintillation unit (40) configured to detect the gamma radiation emitted by the body tissue and filtered by the collimation element (30). The measuring head (20) is configured to operate with variable investigation areas (A).

15 Claims, 5 Drawing Sheets

SCINTIGRAPHIC INTRACAVITARY MEASUREMENT DEVICE

This application is the U.S. national phase of International Application No. PCT/IB2022/059115 filed Sep. 26, 2022, which designated the U.S. and claims priority to IT patent application No. 102021000027752 filed Oct. 29, 2021, the entire contents of each of which are hereby incorporated by reference.

This invention relates to a scintigraphic intracavitary measurement device which can be widely applied in the field of radio-guided surgery (intraoperative, laparoscopic and robot assisted) for locating lymph nodes and tumours and/or other pathologies.

Currently, in order to locate pathologies such as those listed above, measurement devices are known which are configured to capture the gamma ray emission of a radio-pharmaceutical previously administered to the patient, which tends to concentrate precisely in the cells affected by these pathologies.

In the following description, the cells in which the radio-pharmaceutical is concentrated will be denoted by the term "source".

Generally speaking, the known measurement devices, also called "gamma probes" have a measuring head equipped with a single crystal or a plurality of single crystals separated from each other, suitably oriented and configured to absorb the gamma rays emitted by the radiopharmaceutical. The prior art measurement devices also comprise a rod configured to receive at one end the measuring head and at a further end a handgrip configured for suitably directing the measuring head during the medical application. The prior art measurement devices have dimensions which are particularly small and designed for intracavitary use, allowing the exploration of the tissue for identifying the pathology.

In use, the above-mentioned measurement devices are able to record the integral of the events of gamma ray emission by the source and to indicate quickly the points of greatest accumulation, that is to say, the points most affected by the pathology.

In other words, the above-mentioned measurement devices are able to locate, on the basis of the intensity and the quantity of emission of gamma rays, the zone of the patient most affected by the pathology.

Disadvantageously, these measurement devices are not, however, able to provide, together with information regarding the localisation of the pathology, an imaging or visual representation of the zone affected by this pathology.

In this situation, the prior art scintigraphic measurement devices cannot provide a diagnostic for images or imaging and do not therefore allow the areas of tissue affected by the exploration to be displayed. Consequently, the prior art measurement devices provide only a response relative to the maximum value of gamma ray emissions recorded and thus provide only a spatial localisation of the zone most affected by the pathology.

Moreover, in view of the spatial resolution which these measurement devices provide (usually in the order of 1 cm), they are very often not able to distinguish the presence of other pathologies with small dimensions or locate more precisely the shape and/or the extension of the area analysed.

In other words, the measurement devices currently known are configured to locate, in the least possible time, the point with greatest emission of gamma rays, that is to say, the point most affected by the pathology, but they are not able to allow either a more precise localisation of pathologies with smaller dimensions or to provide a diagnosis for images obtained on the basis of a processing of the emission of gamma rays emitted by the various cells of the patient affected by the pathology.

In order to overcome these difficulties, gamma cameras are known which are configured to be used in conjunction with the known scintigraphic measurement devices in such a way that it is possible to perform a preliminary investigation for the surgical operation in order to locate the pathologies and, subsequently, to check the correct execution of the surgical operation.

Disadvantageously, the prior art gamma cameras, although they are particularly compact and small in size, are not suitable for insertion in the body cavities and cannot therefore be considered for intraoperative applications. In effect, in use, the known gamma cameras act outside the patient.

Typically, the known gamma cameras are abutted to the patient in such a way as to record an image. In this situation, although the gamma cameras have separate spatial resolutions they are not designed to provide a precise and reliable analysis of the pathology.

In particular, since the gamma cameras operate outside the body of the patient, the more the pathology is deep in the body, the greater the distance between the camera and the pathology increases, considerably reducing the spatial resolution of the camera. In general, therefore, the distance between the pathology and the camera greatly attenuates the measuring efficiency of the camera itself, often making the pathologies (such as, for example, deep tumours) difficult to identify and display due to inadequate spatial resolution.

In other words, the use of these gamma cameras is particularly suitable for surface lesions which are easy to locate and identify, where the spatial resolution is adequate but, on the contrary, it is not efficient and reliable when the camera-lesion distance is large.

The technical purpose of the invention is therefore to provide a scintigraphic intracavitary measurement device which is able to obviate the drawbacks of the prior art.

The aim of the invention is therefore to provide a scintigraphic intracavitary measurement device which is able to locate in a fast and reliable manner a zone of the patient affected by a pathology and, at the same time, is able to provide a diagnosis for high resolution images for displaying the zone, and in particular for displaying the margins of the zone.

A further aim of the invention is to provide a small-sized scintigraphic intracavitary measurement device.

A further aim of the invention is to provide a scintigraphic intracavitary measurement device that is easy to handle and easy to use.

A further aim of the invention is to provide a scintigraphic intracavitary measurement device having a high versatility of use both as an intracavitary instrument and as an external instrument during diagnosis for surface lesions.

The technical purpose indicated and the aims specified are substantially achieved by a scintigraphic intracavitary measurement device comprising the technical features described in one or more of the appended claims. The dependent claims correspond to possible embodiments of the invention.

Further features and advantages of the invention are more apparent in the non-limiting description which follows of a non-exclusive embodiment of a scintigraphic intracavitary measurement device.

The description is set out below with reference to the accompanying drawings which are provided solely for purposes of illustration without restricting the scope of the invention and in which.

Figure 1:
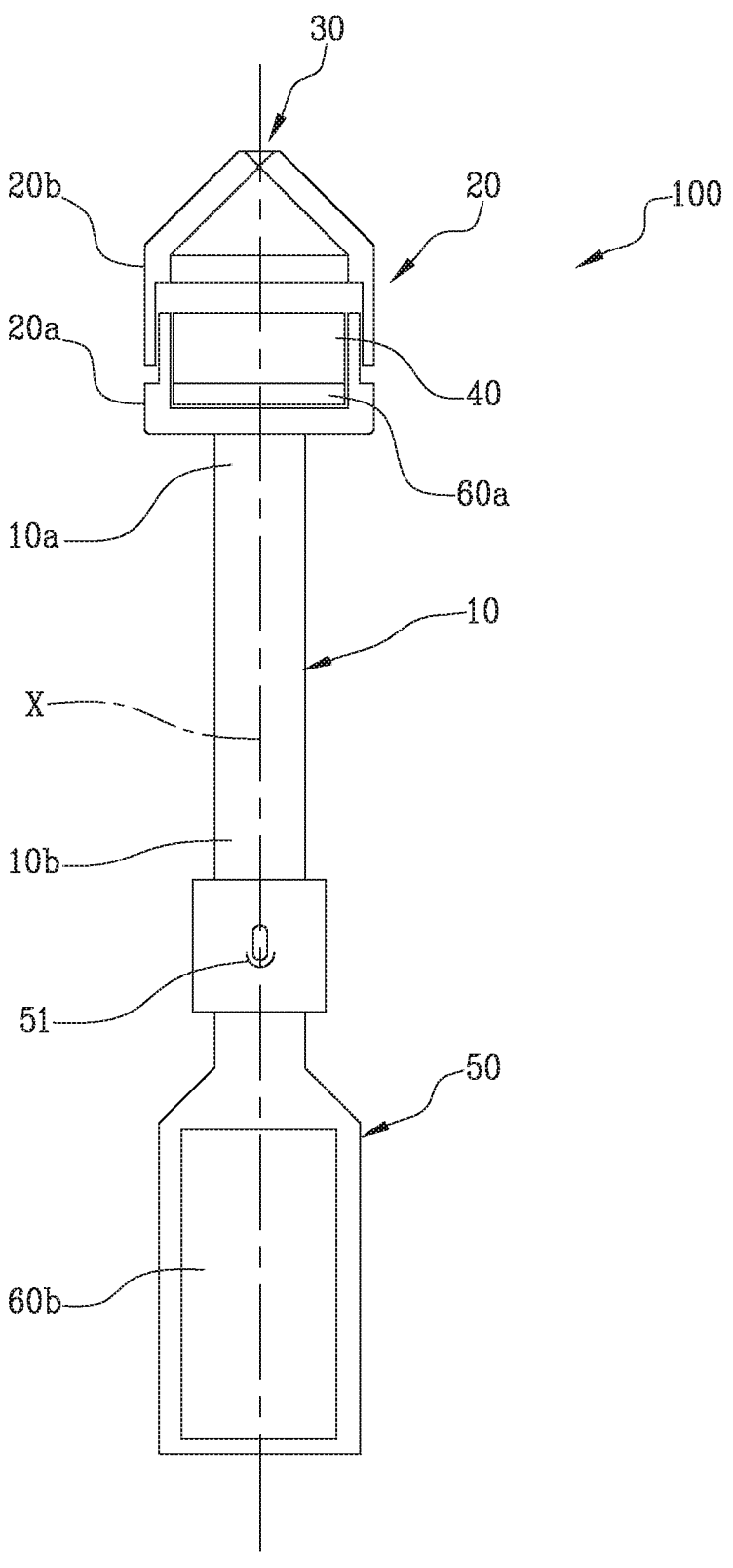
FIG. 1 is a front view of an scintigraphic intracavitary measurement device according to the invention.

With reference to the accompanying drawings, the numeral 100 denotes an scintigraphic intracavitary measurement device comprising a supporting rod 10 extending along a main direction of extension "X" and a measuring head 20 coupled with or integrated with a first end 10a of the supporting rod 10.

The measurement device 100 also comprises a handgrip 50 which can be gripped manually by an operator and is reversibly connectable to a second end 10b of the supporting rod 10 by means of a mechanical connector, as described in detail below, in such a way as to obtain a measurement device 100 made from at least two functionally separate components (handgrip 50 and measuring head 20) and physically separable from each other.

According to a possible embodiment, the measuring head 20 is of the type removably connectable to the supporting rod 10 by means of a mechanical connector (for example of the same configuration and/or size as that defining the connection between the supporting rod 10 and the handgrip 50). However, according to an alternative embodiment, the measuring head 20 is integrated with the supporting rod 10, that is to say, made as one piece.

The measuring head 20 comprises at least one collimation element 30 configured for filtering gamma radiation emitted by a source "S" defined by a suitably energised body tissue, for example by means of a radiopharmaceutical.

Preferably, the collimation element 30 is made of a material with a high atomic number.

Even more preferably, the collimation element 30 is made of a material suitable for screening the gamma radiation incident on the collimation element 30 with an external angle at a predetermined solid investigation angle.

The measuring head 20 also comprises a scintillation unit 40 configured to detect the gamma radiation emitted by the tissue suitably energised and filtered by the collimation element 30.

The scintillation unit 40 comprises a plurality of scintillation crystals organised according to a two-dimensional distribution (for example, in the form of a matrix) in such a way that each scintillation crystal can operate with a respective scintillation area.

Preferably, the scintillation unit 40 comprises a planar and continuous scintillation crystal.

Alternatively, the scintillation unit 40 may comprise a matrix of small scintillation crystals, preferably between 0.5 mm and 2 mm in size.

Preferably, the scintillation unit 40 is sensitive to gamma rays of strength between 30 keV and 1 MeV, which emit light at peak wavelength as a function of their composition in a range from 300 nm-600 nm.

According to an aspect of the invention, according to the preferred embodiment, the measurement device 100 comprises a first electronic conversion circuitry 60a coupled to the scintillation unit 40 and configured to receive optical signals from the scintillation unit 40 and convert them into respective electrical signals.

In particular, the first electronic conversion circuitry 60a comprises a plurality of optoelectronic converters positioned according to a two-dimensional distribution, each of which associated with a respective portion (for example square) of the measuring area and configured to receive optical signals from the scintillation unit 40 and convert them into respective electrical signals. In other words, the sum of the partial areas on which the individual optoelectronic converters act defines the overall measuring area and, therefore, preferably, the surface extension of the scintillation unit.

According to a possible embodiment, the conversion circuitry 60a is made in the form of a Silicon PhotoMultiplier (SiPM) structure arranged in the form of an MPPC matrix, where in particular each MPPC element defines one of the above-mentioned optoelectronic converters.

Alternatively, the conversion circuitry 60a comprises semiconductor elements such as, for example, cadmium telluride or cadmium zinc telluride elements.

According to an aspect of the invention, the Silicon PhotoMultiplier structure comprises a large number of small-sized elements in such a way as to contribute to increasing the intrinsic resolution of the measurement device 100. In the same way, in the case of the semiconductor elements, they are also numerous and small in size in such a way as to increase the intrinsic resolution of the measurement device.

In accordance with the embodiment according to which the measuring head 20 is coupled to the supporting rod 10 by a mechanical connector, the connector is equipped with electric contacts for transferring the optical signals from the first electronic conversion circuitry 60a to at least one electrical conductor inside the supporting rod 10.

Figure 2B:
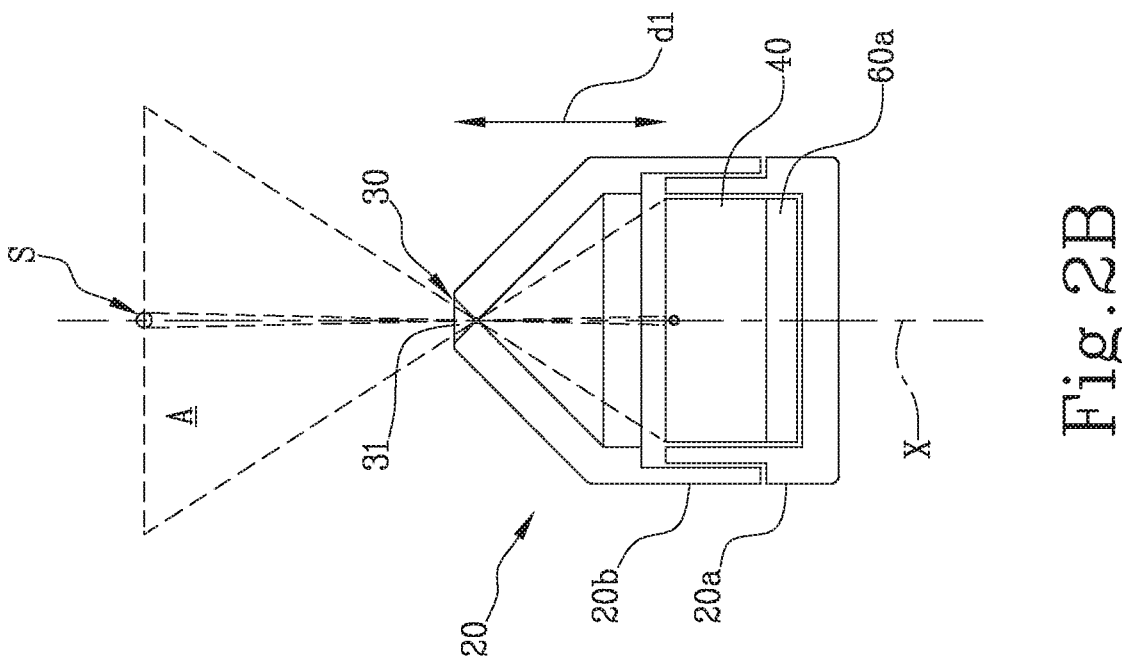
FIGS. 2A and 2B are front views of a measuring head of the gamma detector of FIG. 1 in different configurations.
Figure 2A:
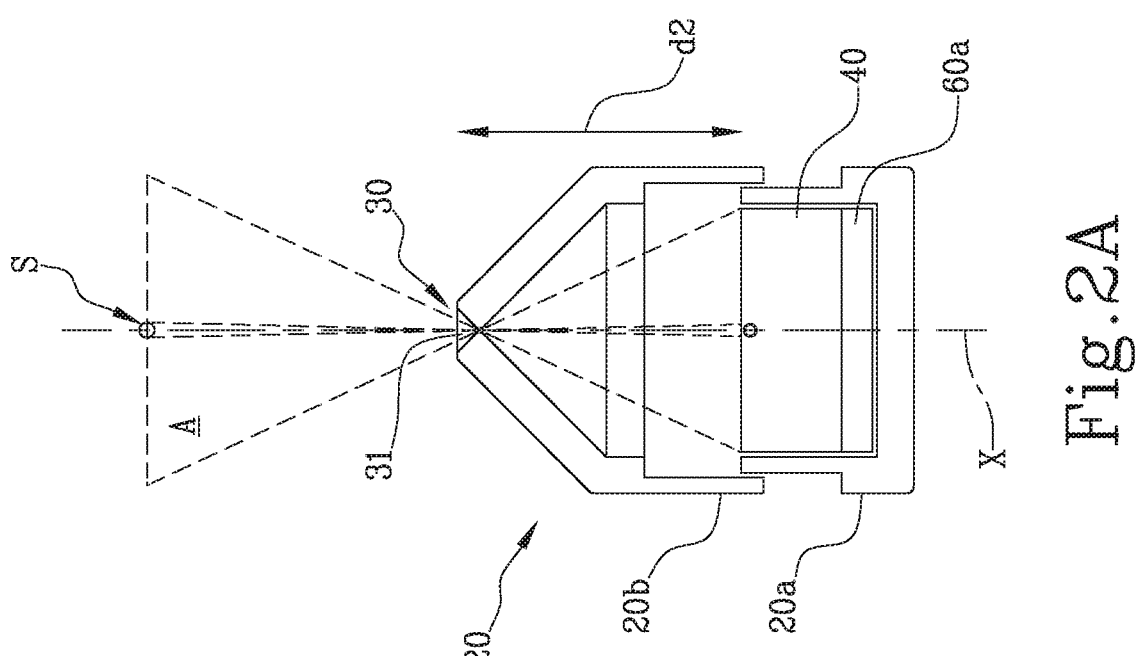

The optical signals represent a shadow projected, during measurement of the gamma radiation, by the collimation element 30 on the scintillation unit 40 (FIGS. 2A and 2B).

In more detail, in use, the collimation element 30 is struck by the gamma radiation emitted by the source. In this situation, only some of the gamma radiation passes through the collimation element 30 and it is filtered by it in such a way as to project a shadow on the scintillation unit 40 which detects a representative image. The image obtained by the filtering of the gamma radiation by the collimation element 30 is an overturned image, inverted and enlarged (FIG. 2A) or made smaller (FIG. 2B) with respect to the reality.

In particular, depending on the different filtration geometries of the collimation element 30 and/or depending on the distance between the collimation element 30 and the source "S", a smaller image or an enlarged image is obtained. This aspect is described in detail below.

According to an aspect of the invention, the measuring head 20 is configured to operate with variable investigation areas "A".

The term "investigation areas" means exploration areas defined by a respective solid investigation angle.

The term "variable investigation areas" means areas of investigation which are variable in terms of spatial dimensions and resolution, in particular having different subtended solid angle values (or at least an angle lying in a plane passing through the axis of the measuring head, that is to say, at least one aperture angle) and/or different spatial resolution values. The main reason for which the measuring head 20 operates with variable investigation areas "A" is linked to the various operating steps which are encountered during a radio-guided surgical operation.

In particular, a preliminary step of locating the pathology, in which the pathology must be quickly located, is followed by a step of approaching the zone most affected by the pathology, in which there is a need to more precisely view the zone.

In this situation, in order to quickly perform the localisation of the zone affected by the pathology, the measuring head 20 explores the affected part of the patient by means of a large investigation area "A" having less spatial resolution in such a way as to identify in the least possible time the affected zone of the pathology. On the other hand, during the approach step, the measuring head 20 operates by means of a small area of investigation "A" having a greater spatial resolution in such a way as to obtain an accurate and clear representation (even in terms of margins of the lesion) of the zone affected by the pathology.

According to an aspect of the invention, in order to vary the investigation area "A" it is possible to vary the distance between the collimation element 30 and the source "S".

In this regard, as shown in FIGS. 2A-3B, the measuring head 20 comprises a first portion 20a defining a receiving seat for the scintillation unit 40 and a second portion 20b carrying the collimation element 30.

The second portion 20b is axially slidable relative to the first portion 20a along the main direction of extension "X" between a retracted position (FIGS. 2B, 3B), in which it maintains the collimation element 30 at a first axial distance "d1" from the scintillation unit 40, and an extracted position (FIGS. 2A, 3A), in which it maintains the collimation element 30 at a second axial distance "d2" from the scintillation unit 40. The first axial distance "d1" is less than the second axial distance "d2".

According to a possible embodiment, the second portion 20b can slide axially relative to the first portion 20a by means of a micrometric screw actuation mechanism operating between the first and the second portions 20a, 20b.

Preferably, the mechanical system is outside the measuring head 20 and more preferably also outside the trocar and is operated manually by an operator with the hand gripping the micrometric screw (or other operating member). In particular, in that case the supporting rod 10 may be formed by an inner pipe and an outer sheath, the first integral with the first portion 20a of the measuring head 20 and the second integral with the second portion 20b of the measuring head 20, and the actuation mechanism acts on the inner pipe and/or on the outer sheath to produce a relative movement. This is particularly suitable for an intracavitary solution where it is necessary to carry out an axial movement at a distance.

As shown in FIGS. 2A-3B, depending on the position occupied by the second portion 20b, the investigation area "A" has a greater or lesser extension.

In more detail, if the second portion 20b is in the retracted position (that is, close to the first portion 20a and therefore away from the source "S"), the investigation area "A" has a greater dimension and therefore a smaller spatial resolution.

On the other hand, if the second portion 20b is in the extracted position (that is to say, away from the first portion 20a and therefore close to the source "S"), the investigation area "A" has a smaller dimension and therefore a larger spatial resolution by which it is able to distinguish differentiated zones of biodistribution. The retracted position is thus occupied by the second portion 20b during the preliminary step of locating the pathology in which it is necessary to locate quickly the zone affected by the pathology, whilst the extracted position is adopted by the second portion 20b during the step of approaching the pathology. Advantageously, thanks to the possibility of moving the second portion 20b relative to the first portion 20a, it is possible to perform, with the same measurement device 100, the various steps of locating the pathology.

In other words, the measurement device 100 according to the invention offers the twofold function of operating both as a classic scintigraphic measurement device providing indications for locating the position of the zone with maximum gamma radiation emission, and as an image diagnostic device, identifying the margins of the lesion and detailing the various parts of the zone identified as most affected by the pathology.

Figure 3B:
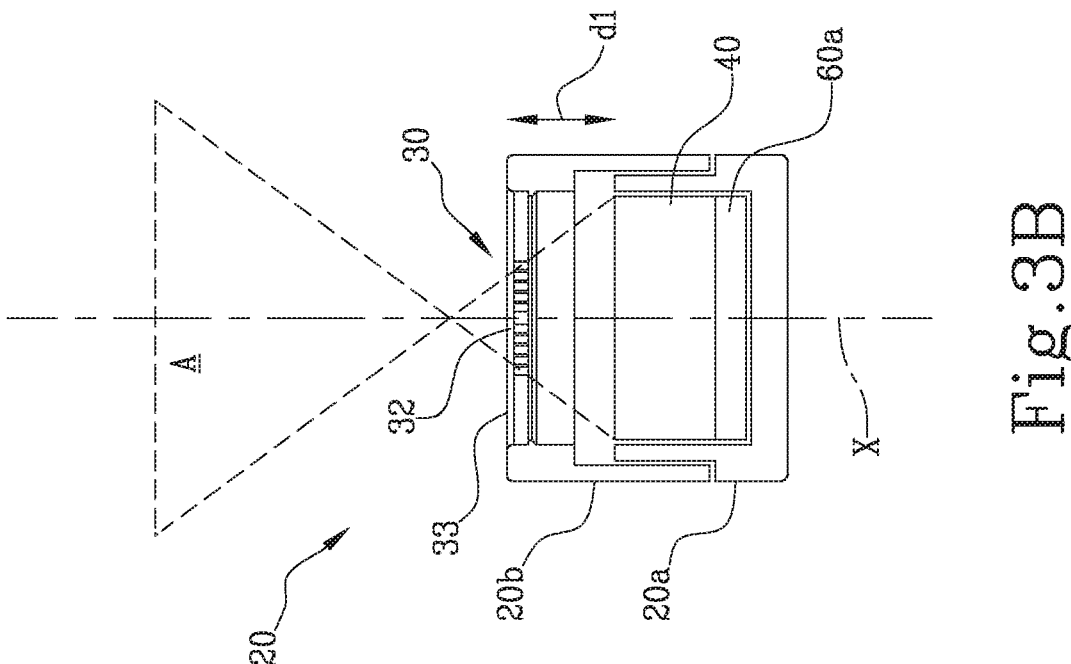
FIGS. 3A and 3B are front views of a further measuring head of the gamma detector of FIG. 1 in different configurations.

In use, therefore, in order to perform the preliminary localisation step, the second portion 20b is in the retracted position. As shown in FIGS. 2B, 3B, the collimation element 30 defines a large solid investigation angle and therefore a corresponding extended investigation area "A" having a low spatial resolution. In this situation, when the measuring head 20 is struck by the gamma radiation emitted by the source "S", the gamma radiations having an angle outside the solid investigation angle are screened, whilst the gamma radiations having an angle inside the solid investigation angle pass through the collimation element 30 and are filtered.

Since the investigation area "A" is large, but with a low spatial resolution, it is possible in a short time to explore the zones of the patient in such a way as to quickly identify the area most affected by the pathology.

After this localisation, the second portion 20b of the measuring head 20 is moved to the extracted position in such a way as to perform the approaching step. As shown in FIGS. 2A and 2B, the collimation element 30 defines a limited solid investigation angle and therefore a corresponding investigation area "A" which is limited in size and having a high spatial resolution. In this situation, small areas are explored in terms of spatial extension but the images obtained on the scintillation unit 40 are enlarged and have a high definition.

Alternatively to the variation of the distance between the collimation element 30 and the source "S" (or, if necessary, in combination with this variation in distance), for varying the investigation areas "A", the measuring head 20 comprises a plurality of collimation elements 30 applicable to the measuring head 20 and interchangeable with each other. In this situation, the collimation elements 30 have different geometries for filtering the gamma radiation in such a way as to provide different investigation areas "A".

In other words, it is possible to vary the investigation area "A" by varying different physical and/or geometrical parameters of the collimation element 30.

An example is shown in FIGS. 2A and 2B which shows a collimation element 30 comprising a single calibrated hole 31.

Preferably, the calibrated hole 31 is centred on the main direction of extension "X".

Even more preferably, the calibrated hole 31 has a section tapered downwards in such a way as to better filter the gamma radiation.

According to this embodiment, in order to vary the investigation area "A", it is possible to vary the geometrical parameter relative to the diameter of the calibrated hole 31. In more detail, smaller diameters correspond to a better spatial resolution whilst larger diameters correspond to a smaller spatial resolution more suitable for the preliminary localisation step.

Preferably, the calibrated hole 31 has an area less than the measuring area defined by the scintillation unit. In particular, the area of the calibrated hole 31 is between ⅕₀ and ⅕₀₀ of the total investigation area "A".

More preferably, the area of the calibrated hole 31 is equal to or less than the portion of the measuring area associated with each optoelectronic converter. Alternatively, the area of the calibrated hole 31 is equal to or greater than the portion of the measuring area associated with each optoelectronic converter.

In use, therefore, during the preliminary localisation step, a collimation element 30 is used having a larger diameter of the calibrated hole 31. On the other hand, during the approach step, use is made of a collimation element 30 having a smaller diameter of the calibrated hole 31.

According to a preferred embodiment, in order to vary the diameter of the calibrated hole 31, the measurement device 100 comprises an adjusting device designed to modify the diameter.

Alternatively, the measuring head 20 may comprise a plurality of collimation elements 30 provided with calibrated holes 31 of different diameters and applicable to the measuring head 20 in an interchangeable fashion.

Figure 3A:
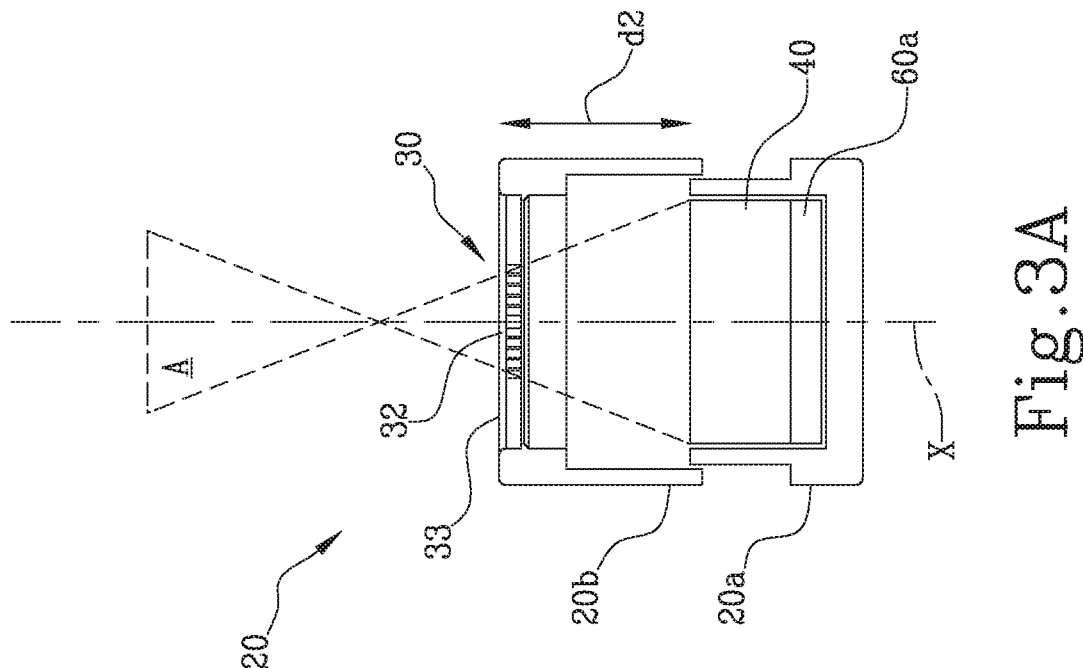

A further example is shown in FIGS. 3A and 3B which shows a collimation element 30 comprising a metal plate 33 (for example made of tungsten) extending transversally to the main direction of extension "X" and having a plurality of through holes 32. The plurality of through holes 32 is distributed on the metal plate 33 in such a way as to form a coded aperture mask (MURA).

Preferably, the plurality of through holes 32 is distributed on the metal plate 33 according to a distribution which is not symmetrical relative to the main direction of extension "X".

Figure 4B:
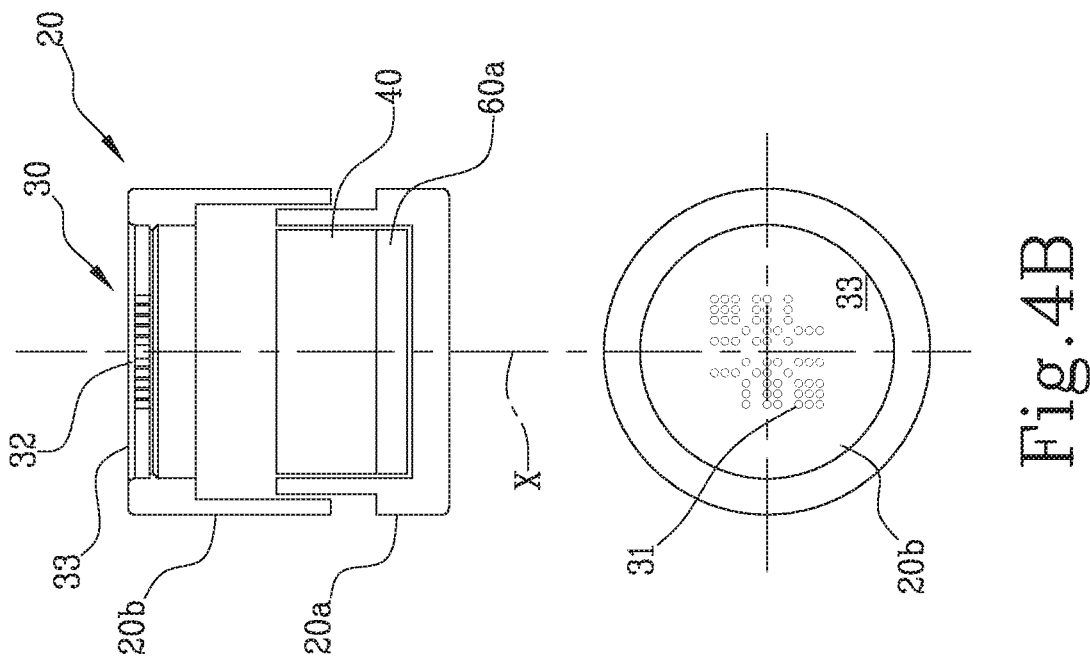
FIGS. 4A and 4B are respective cross sections of the measuring heads shown in FIGS. 2A and 3A.
Figure 4A:
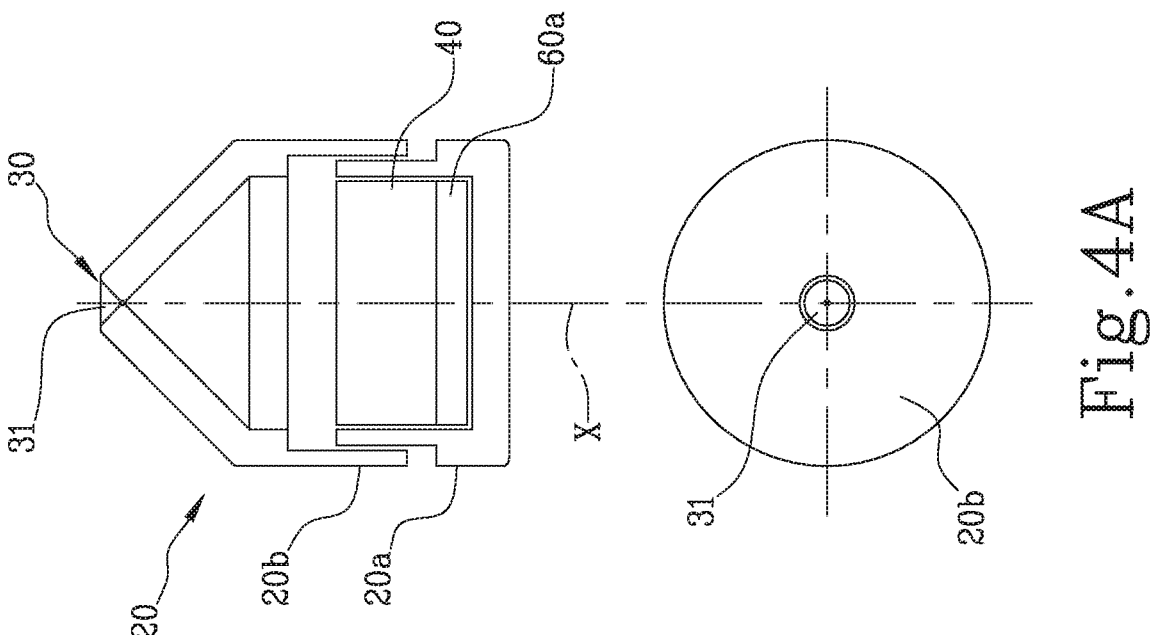

As shown in FIGS. 4A and 4B, this embodiment provides a different geometry of filtering the gamma radiation with respect to that provided by the embodiment of FIGS. 2A-2B.

In effect, the presence of several through holes 32 allows a greater number of gamma radiations to be filtered without altering the spatial resolution linked to the single hole.

In other words, since the coded aperture mask is provided with two or more through holes 33, each of them is able to filter a part of gamma radiation emitted by the source "S" and therefore, with respect to the single calibrated hole 31, it is able to filter more gamma radiation. However, since each through hole 33 has a relative diameter on which the spatial resolution depends (as mentioned above), the number of holes does not affect it and allows the spatial resolution to be maintained unchanged.

In the case of use of coded aperture masks, the measurement device 10 comprises a control unit configured to: receive the electrical signals from the first electronic conversion circuitry 60a, store data representing the position of each through hole 32 of the plurality of holes on the metal plate 33 and to determine, on the basis of a processing of the electrical signals and position data, a map representing the shape or position of the source "S", in particular by means of a predetermined non-linear algorithm.

In use, therefore, the gamma radiation emitted by the source "S" is filtered through the coded aperture mask. In this situation, the scintillation unit 40 detects an image, for each through hole 32, and the first electronic conversion circuitry 60a converts the image into a respective electrical signal. The electrical signal is sent to the control unit which processes it together with the position data in such a way as to recreate the distribution of the emission activity of the source "S".

In the case of coded aperture masks, depending on the distribution of the plurality of through holes 32 on the metal plate 33 and/or depending on the number of through holes 33, it is possible to vary the filtration geometry.

In order to vary the spatial resolution, on the other hand, it is possible to vary the physical parameter relative to the diameter of each through hole 32 of the plurality of holes and/or the thickness of the metal plate 33.

According to a preferred embodiment, the measuring head 20 may comprise a plurality of coded aperture masks, applicable to the measuring head 20 in an interchangeable fashion. Each coded aperture mask of the plurality of masks has through holes 32 of different diameters and/or a different distribution of the through holes 32. In this situation, depending on the need for investigation it will be possible to replace the coded aperture mask with a further coded aperture mask having a different distribution of the plurality of through holes 32 and/or through holes 32 with different diameters.

In other words, therefore, thanks to the possibility of varying the physical and/or geometrical properties of the collimation element 30 (such as, for example, the distance of the collimation element 30 from the source "S", the number of holes 31, 32, the diameter of the holes 31, 32, the distribution of the holes 32 and the like) it is possible to obtain an measurement device 100 which is adaptive and able to vary its investigation area "A" and its spatial resolution depending on operating requirements.

Advantageously, the measurement device 100, according to the invention, allows both the zone affected by the pathology to be quickly localised and to distinguish zones with differentiated biodistribution.

Advantageously, the use of the collimation element 30 allows the measuring head 20 to operate on variable investigation areas "A" which in turn allow the dimensions of the measuring head 20 to be kept compact, making it optimum for intraoperative applications.

More specifically, according to the preferred embodiment, the measuring head 20 has a substantially cylindrical shape the external diameter of which is less than 12 mm and, preferably, less than 8 mm. This means that, unlike the current gamma cameras, the measurement device 100 according to the invention can be inserted in the body cavities of the patient to provide a localisation of the pathology and a diagnosis by images of the pathology with high resolution.

Figure 5B:
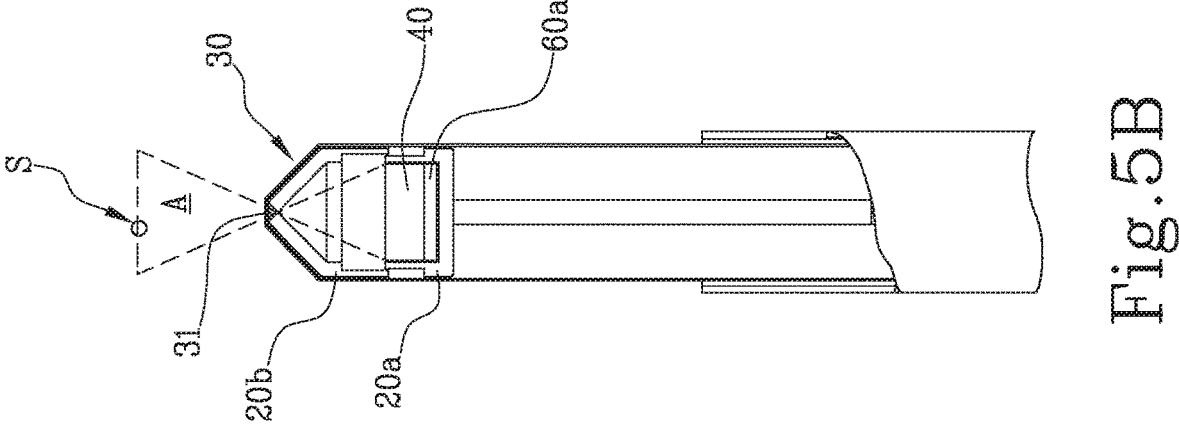
FIGS. 5A and 5B are front views of a scintigraphic intracavitary measurement device mounted in a trocar in two different configurations.
Figure 5A:
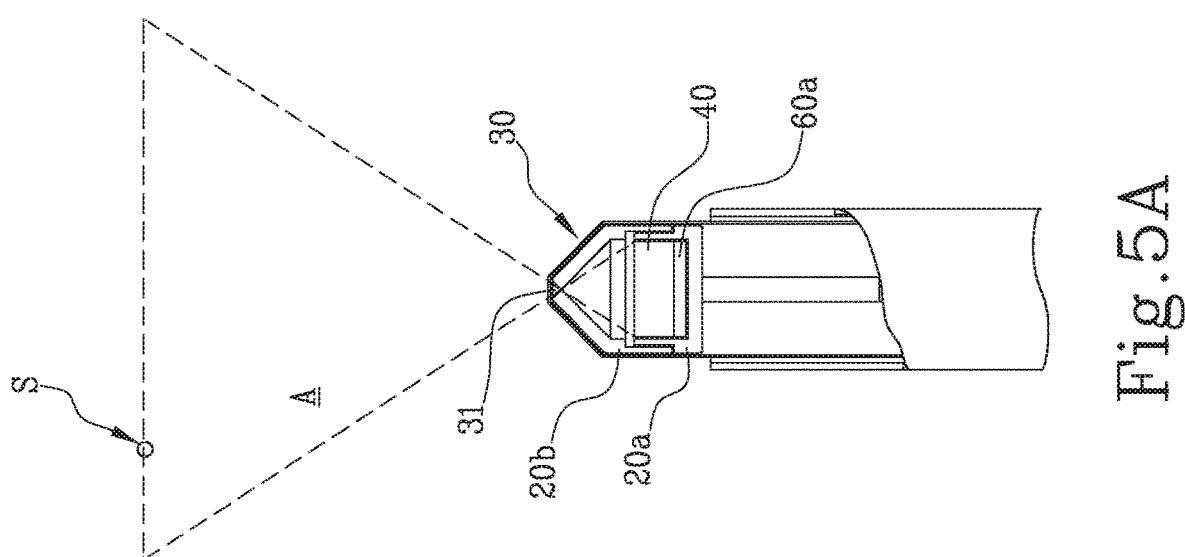

An example of application of the measurement device 100, according to the invention, is shown in FIGS. 5A and 5B in which the measurement device 100 is inserted inside a trocar.

Advantageously, even in the presence of a source "S" with low emission of gamma radiation, the measurements device 100 is able to provide a reliable response locating the zone and identifying the margins of lesion.

According to an aspect of the invention, during the preliminary localisation step and during the approach step, the orientation of the measurement device 100, and therefore of the measuring head 20, occurs manually by an operator who directs the measuring head 20 using the handgrip 50.

According to the embodiment shown in the accompanying drawings, the handgrip 50 comprises an activation device 51 configured for moving the second portion 20b between the extracted position and the retracted position.

The handgrip 50 has a transversal dimension greater than the transversal dimension of the supporting rod 10 and it is equipped internally with a second electronics circuitry 60b for converting the signals configured for converting the analogue signals deriving from the first electronic converter circuitry 60a into digital signals and, if necessary, for performing a first processing of these signals. According to a possible embodiment, the mechanical connector which connects the supporting rod 10 to the handgrip 50 is positioned at a variation of transversal cross-section between the handgrip 50 and the supporting rod 10 in such a way that the second end 10*b* of the supporting rod 10 can be inserted inside the handgrip 50 and locked by the interaction of the mechanical connector 12 with the handgrip 50.

According to the preferred embodiment, the mechanical connector is made in the form of a bayonet coupling.

According to different embodiments, the mechanical connector may be made in the form of a quick coupling, a snap-on coupling, a threaded connection or a threaded ring nut.

According to another aspect of the invention, the measuring head 20 may also be associated with the first end 10*a* of the supporting rod 10 by means of a mechanical connector equipped with electrical contacts for transferring the signal from the first electronic conversion circuitry 60*a* to at least one electrical conductor inside the supporting rod 10.

In other words, the measuring head 20 can be reversibly coupled to the first end 10*a* of the supporting rod 10 in such a way that several different measuring heads 20 can be applied to the first end 10*a* of a same supporting rod 10.

Preferably, the mechanical connector reversibly connecting the measuring head 20 to the supporting rod 10 is identical to the mechanical connector defining the connection between the supporting rod 10 and the handgrip 50.

According to an aspect of the invention, the measurement device 100 also comprises a processing unit connected to the second electronic conversion circuitry 60*b* of the handgrip 50 by Wi-Fi, Bluetooth or via cable in such a way that the signals are transmitted from the second electronic conversion circuitry 60*b* to the processing unit.

Preferably, the processing unit is also connected to the control unit.

According to a preferred embodiment, the processing unit comprises a monitor, which shows the operator the processing of the signals coming from the measurement device 100 and the images acquired, in particular providing an image representing in a graphical and easily legible manner the data contained in these signals.

The invention achieves the preset aims eliminating the drawbacks of the prior art. In particular, this invention provides a scintigraphic intracavitary measurement device which is able to offer the twofold function of operating as a classic scintigraphic measurement device providing indications for locating the position of the zone with maximum gamma ray emission and as a diagnostic device for images, indicating the margins of the lesion detailing the various parts of the zone identified as most affected by the pathology.

The invention also provides an scintigraphic intracavitary measurement device having compact dimensions suitable for intracavitary use.

The invention claimed is:

1. A scintigraphic intracavitary measurement device (100) comprising:
   a supporting rod (10) extending along a main direction of extension (X);
   a measuring head (20) coupled or integrated with a first end (10*a*) of said supporting rod (10) and comprising:
   at least one collimation element (30) configured for filtering gamma radiation emitted by a source(S) defined by a suitably energised body tissue;

a scintillation unit (40) defining an overall measuring area and configured for detecting the gamma radiation emitted by said body tissue and filtered by said collimation element (30);
   an electronic conversion circuitry (60*a*) associated with the scintillation unit and comprising a plurality of optoelectronic converters positioned according to a two-dimensional distribution, each converter being associated with a respective portion of the measuring area and configured for receiving optical signals from the scintillation unit (40) and converting them into respective electrical signals;
   wherein said measuring head (20) is configured to operate with variable investigation areas (A).

2. The measurement device according to claim 1, wherein the measuring head (20) comprises a first portion (20*a*) defining a seat for receiving said scintillation unit (40) and a second portion (20*b*) carrying said collimation element (30), the second portion (20*b*) being axially slidable with respect to the first portion (20*a*) along the main direction of extension (X) between a retracted position, in which it maintains the collimation element (30) at a first axial distance (d1) from said scintillation unit (40), and an extracted position, in which it maintains the collimation element (30) at a second axial distance (d2) from said scintillation unit (40), the first axial distance (d1) being less than the second axial distance (d2).

3. The measurement device according to claim 1, wherein the collimation element (30) comprises a single calibrated hole (31) preferably centred on the main direction of extension (X).

4. The measurement device according to claim 3, comprising an adjustment device configured to vary the diameter of said single hole (31).

5. The measurement device according to claim 3, wherein said single calibrated hole (31) has an area less than the measuring area defined by the scintillation unit, in particular the area of said single calibrated hole (31) is between 1/50 and 1/500 of the measuring area.

6. The measurement device according to claim 5, wherein said single calibrated hole (31) has an area equal to or less than said portion of the measuring area associated with each optoelectronic converter.

7. The measurement device according to claim 5, wherein said single calibrated hole (31) has an area equal to or greater than said portion of the measuring area associated with each optoelectronic converter.

8. The measurement device according to claim 1, wherein the collimation element (30) comprises a metal plate (33) extending transversely to the main direction of extension (X) and having a plurality of through holes (32), said plurality of through holes (32) being distributed on the metal plate (33) in such a way as to form a modified uniformly redundant array (MURA), preferably according to a distribution which is not symmetrical with respect to said main direction of extension (X).

9. The measurement device according to claim 8 comprising a control unit configured for:
   receiving the electrical signals from said electronic conversion circuitry (60*a*);
   storing data representing the position of each hole of said plurality of through holes (32) on the metal plate (33);
   determining, on the basis of a processing of the electrical signals and the position data, a map representing the shape or position of the source(S), in particular by means of a predetermined non-linear algorithm.

10. The measurement device according to claim 8, comprising a handgrip (50) which can be held manually by an operator and reversibly connectable to a second end (10b) of the supporting rod (10) by means of a mechanical connector equipped with electrical contacts for transferring signals from said first electronic conversion circuitry (60a) to at least one electrical conductor inside said handgrip (50).

11. The measurement device according to claim 10, wherein the handgrip (50) comprises an activation device (51) configured to move the second portion (20b) between the retracted position and the extracted position and vice versa.

12. The measurement device according to claim 1, wherein the measuring head (20) comprises a plurality of collimation elements (30) applicable to the measuring head (20) and interchangeable with each other, and wherein said collimation elements (30) have different geometries for filtering gamma radiation in such a way as to provide different investigation areas (A).

13. The measurement device according to claim 1, wherein the electronic conversion circuitry (60a) comprises a Silicon PhotoMultiplier (SiPM) structure which is arranged in the form of an MPPC matrix.

14. The measurement device (R) according to claim 1, wherein the measuring head (20) is removably coupled with the first end (10a) of said supporting rod (10) by means of a mechanical connector equipped with electrical contacts for transferring signals from said first electronic conversion circuitry (60a) to at least one electrical conductor inside the supporting rod (10).

15. The measurement device according to claim 1, wherein the measuring head (20) has a substantially cylindrical shape and wherein the external diameter of said measuring head (20) is less than 12 mm and preferably less than 8 mm.

* * * * *